D. PERLMAN.
SAFETY DEVICE FOR CIRCULAR KNIFE CLOTH CUTTING MACHINES.
APPLICATION FILED APR. 1, 1913.
1,080,518.          Patented Dec. 2, 1913.
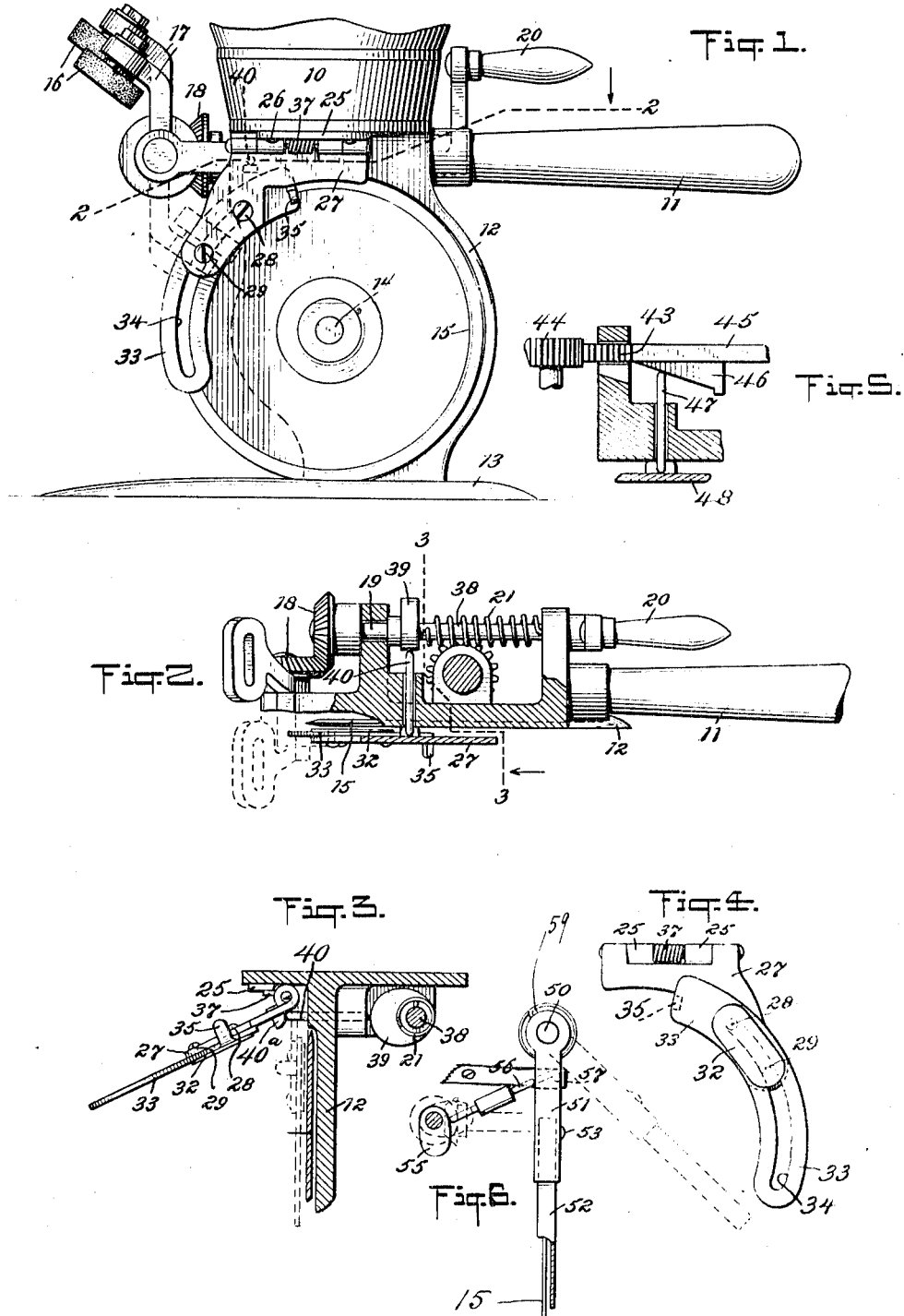
Witnesses:
Benjamin Schoengold
Joseph Schoengold
Inventor
David Perlman
By his Attorneys
Soeper & Gopel

UNITED STATES PATENT OFFICE.

DAVID PERLMAN, OF NEW YORK, N. Y., ASSIGNOR OF ONE-THIRD TO MARTIN ZAWISTOWSKI AND ONE-THIRD TO NICOLAS KOMOW, OF NEW YORK, N. Y.

SAFETY DEVICE FOR CIRCULAR-KNIFE CLOTH-CUTTING MACHINES.

1,080,518.  Specification of Letters Patent.  Patented Dec. 2, 1913.

Application filed April 1, 1913.  Serial No. 758,205.

*To all whom it may concern:*

Be it known that I, DAVID PERLMAN, a subject of the Czar of Russia, and a resident of New York city, county and State of New York, have invented certain new and useful Improvements in Safety Devices for Circular-Knife Cloth-Cutting Machines, of which the following is a specification.

The object of this invention is to provide for circular knife cloth cutting machines a simple attachment which will prevent the operators from being injured during the operation of the machine.

For this purpose my invention consists in means in the path of the knife blades which are normally in position to prevent the operator from being injured, and which may be readily placed out of position so as to enable the knife to be sharpened or adjusted or taken out; the knife protecting means being movable into or out of position on the movement of the grinding devices.

In the accompanying drawings, Figure 1 is a side elevation of a circular knife cloth cutting machine with my improved attachmen' applied thereto, Fig. 2 is a horizontal section thereof on line 2—2 of Fig. 1, Fig. 3 is a transverse section on line 3—3 of Fig. 2 showing my attachment in operative and inoperative position, Fig. 4 is a modified view of the attachment, Fig. 5 is a section of a modified form of means for operating the attachment, and Fig. 6 shows another modified form.

Similar characters of reference indicate corresponding parts throughout the various figures.

Referring to the drawings and more particularly to Fig. 1, the cloth cutting machine is provided with means 10 for supporting the motor. To the supporting means 10 a handle 11 is secured, which may be integral with a plate 12 having a foot 13, which slides along the table on which the cloth to be cut is placed. Centrally to the plate 12, a shaft 14 is provided, to which is secured a disk knife 15, which cuts the cloth as the slide is moved along the places marked on the cloth. Laterally of the handle 11, a grinding device is arranged, indicated by 16, supported by arms 17, which are operated by bevel gears 18, one of which is secured to a shaft 19 operated by a handle 20. A spring 21 tends always to maintain the grinding roller in the position shown in Fig. 1. If, however, the knife has to be ground, then the handle 20 is operated and brings the roller 16 to the knife edge, and a continuous rotation of the knife edge against the grinding rollers causes the knife to be sharpened. These parts are all well known in cloth cutting machines. The object of this invention is to provide means to do speedy grinding without throwing the guard out of adjustment and also to prevent injury to the operator.

One embodiment of my invention is shown in Fig. 1. To the motor-holding means 10 a plate 25 is secured by means of screws 26, to which plate 25 a second plate 27 is hinged. These two plates have a spring 37 therebetween, which spring tends to keep the plate 27 in the vertical position shown in dotted lines in Fig. 3.

The plate 27 has two pins 28 and 29 secured to a German silver or steel spring plate of a certain elasticity indicated by 32. Between this plate 32 and the plate 27, an arc-shaped plate 33 is arranged, which arc-shaped plate has a slot 34 in which the pins fit. The arc-shaped plate is slidable in respect to the plate 27 by means of the slot passing as a guide-way around the pins 28 and 29. The friction between this German silver plate 32 and the arc-shaped plate is sufficient to keep the arc shaped plate in any position in which it is set. The movement of the arc-shaped plate is facilitated by a handle 35 arranged at one end. Normally, the spring 37 keeps the arc-shaped plate close to the knife-edge, but a certain distance apart to permit the knife to rotate without contacting with the arc-shaped plate, but in such a position as to prevent the operator from getting his hands near the knife. When, however, it is necessary to sharpen the knife, and bring the grinder 16 against the knife, it becomes necessary to move away the arc-shaped plate. For this purpose, the handle 20 is operated, and this handle operates the shaft 38 to which is secured an eccentric cam 39. This cam 39 operates a pin 40 clearly shown in Fig. 2, which pin 40 strikes against the hinged plate 27 and moves it outwardly as shown in Fig. 3. The hinged plate 27 is provided with an abutment 40$^a$ so as to enable the plate to be swung as much as possible, as also to enable the plate to return readily to vertical position as soon as the eccentric cam 39 is again moved into its initial position.

In the embodiment of Fig. 5, the operating means are somewhat changed to adapt them to a slidingly operating grinding device. In this case the bevel gears 18 are substituted by a rack 43 and pinion 44 and a rod 45. The rod 45 moves the wedge 46, and this moves the pin 47 against the hinged plate 48 as shown in Fig. 5. Thus, by the simultaneous movement of the grinding device, due to the sliding of the plate or rod 45, the hinged plate 48 is also moved. In the embodiment shown in Fig. 6, a straight piece is provided. The straight piece is hinged to the machine at 50 and is secured in position by a spring 59, which straight piece 51 has another straight piece telescopically connected therewith and secured in any position by means of a screw 53. These parts 51 and 52 are arranged so as to protect the knife, and thereby prevent the operator from getting in contact therewith, a portion of the part 52 being cut away to form an angular shape. The operation of this plate 51 is similar to the operation of the plate shown in Figs. 2 and 3, another eccentric 55 being arranged, operating on a pin 56, and a locking spring 57 being provided to always maintain the plate 51 in operative position. This spring 57 prevents accidental movements of the guard. When the pin operates it, it pushes the spring away and then the swinging guard may be moved. This guard may be moved by means of a rack and pinion or any other means whereby the protecting device may be raised or lowered away from the knife edge. This protecting device does not need to be telescopically arranged, but may be in any manner as long as it may be brought into the path of the knife so as to protect the operator or be moved out of it when the grinding rollers are brought down to the edge.

My invention has the advantage of protecting the operators from being injured during the operation of the cloth cutting machine, and thereby serious injury may be prevented, the protecting means being always movable with the grinding means.

I have shown various embodiments of my invention, but it is clear that changes may be made therein without departing from the spirit of the invention as defined by the appended claims.

Having thus described my invention, I claim as new and desire to secure by Letters Patent:

1. The combination with a circular knife and a support therefor of a laterally swinging plate hinged to said support, a spring tending to hold said swinging plate in protective position with reference to said circular knife, and means for swinging said plate outward away from said knife.

2. The combination with a circular knife and a support therefor of a laterally swinging plate hinged to said support, a spring tending to hold said swinging plate in protective position with reference to said circular knife, a laterally sliding pin movable in said support and engaging said hinged plate, a cam engaging said pin, and a shaft carrying said cam.

3. The combination with a circular knife and a support therefor of a laterally swinging plate hinged to said support, a spring tending to hold said swinging plate in protective position with reference to said circular knife, means for swinging said plate outward away from said knife, a grinding device movable into and out of engagement with said knife, a shaft, means connected with said shaft for shifting said grinding device, and means connected with said shaft for simultaneously swinging said plate laterally outward away from said knife.

4. The combination with a circular knife and a support therefor of a laterally swinging plate hinged to said support, a spring tending to hold said swinging plate in protective position with reference to said circular knife, an arc-shaped guard adjustable on said swinging plate, and means for swinging said plate outward away from said knife.

In testimony, that I claim the foregoing as my invention, I have signed my name in presence of two subscribing witnesses.

DAVID PERLMAN.

Witnesses:
BENJAMIN SCHOENGOLD,
JOSEPH SCHOENGOLD.